Aug. 15, 1967

R. M. BUCHWALD 3,335,621

HAND BRAKE LEVER MECHANISM CONVERTIBLE
TO A FLY-OFF HAND BRAKE

Filed May 17, 1965

INVENTOR.
Robert M. Buchwald
BY
Donald P. Selvecki
HIS ATTORNEY

Aug. 15, 1967
R. M. BUCHWALD
3,335,621
HAND BRAKE LEVER MECHANISM CONVERTIBLE
TO A FLY-OFF HAND BRAKE
Filed May 17, 1965
2 Sheets-Sheet 2
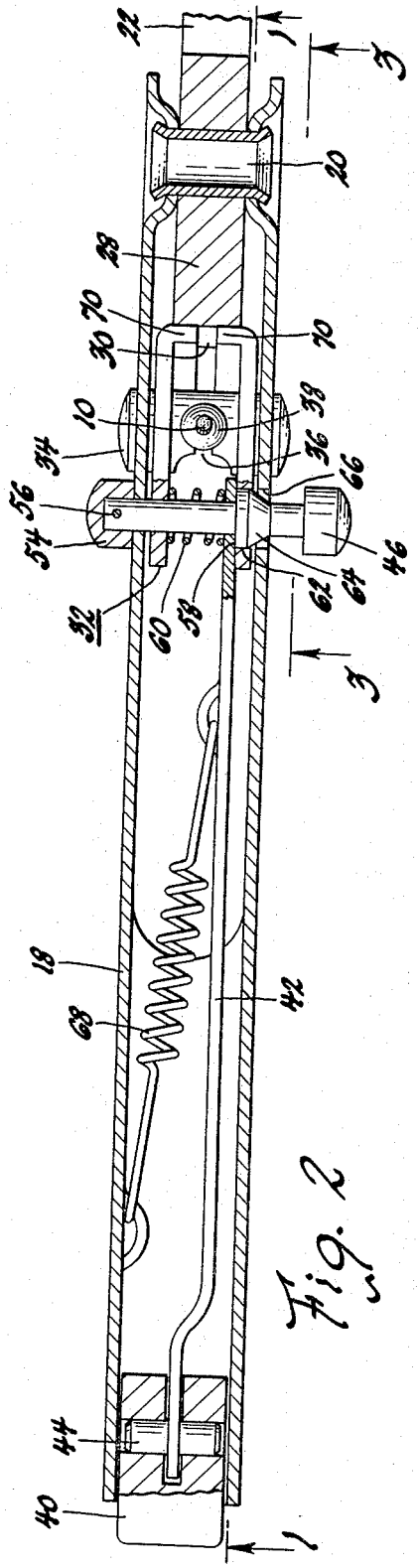
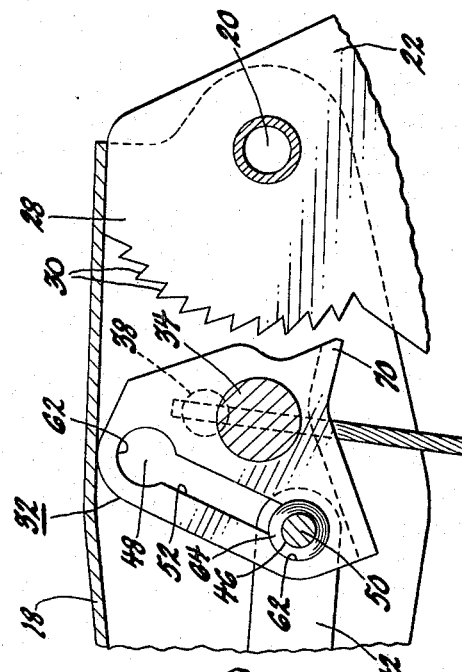
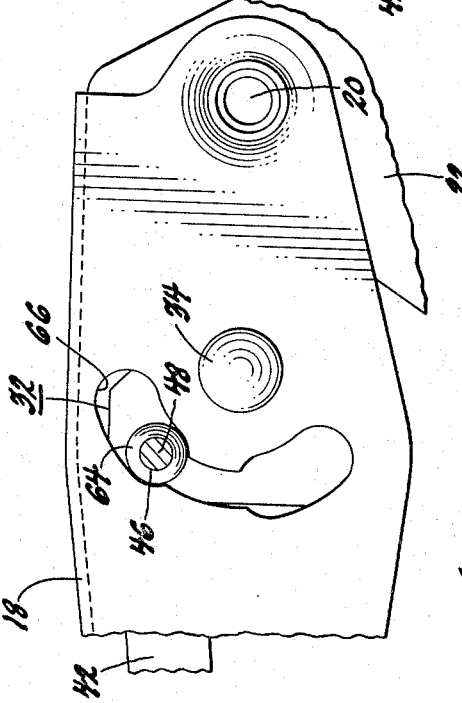
INVENTOR.
Robert M. Buchwald
BY
Donald P. Selwerk
HIS ATTORNEY

United States Patent Office 3,335,621
Patented Aug. 15, 1967

3,335,621
HAND BRAKE LEVER MECHANISM CONVERTIBLE TO A FLY-OFF HAND BRAKE
Robert M. Buchwald, Berkley, Mich., assignor to General Motors Corporation, Detroit, Mich., a corporation of Delaware
Filed May 17, 1965, Ser. No. 456,189
6 Claims. (Cl. 74—538)

ABSTRACT OF THE DISCLOSURE

A hand brake lever mechanism which can be converted from one of conventional operation to one which can be rapidly released. For conventional operation, a handle having a pawl is rotated about a ratchet to apply the brakes, the pawl engaging the ratchet when pressure on the handle is relieved. Release is accomplished by pivoting the pawl out of engagement with the ratchet by a control means connected to the pawl. For rapid release operation, the control means is connected to the pawl at another point, the pawl engaging the ratchet when pressure is applied to the control means for brake application. Release is accomplished by pressure on the handle in the brake applying direction causing the pawl to be automatically withdrawn from the ratchet.

---

Figure 1:
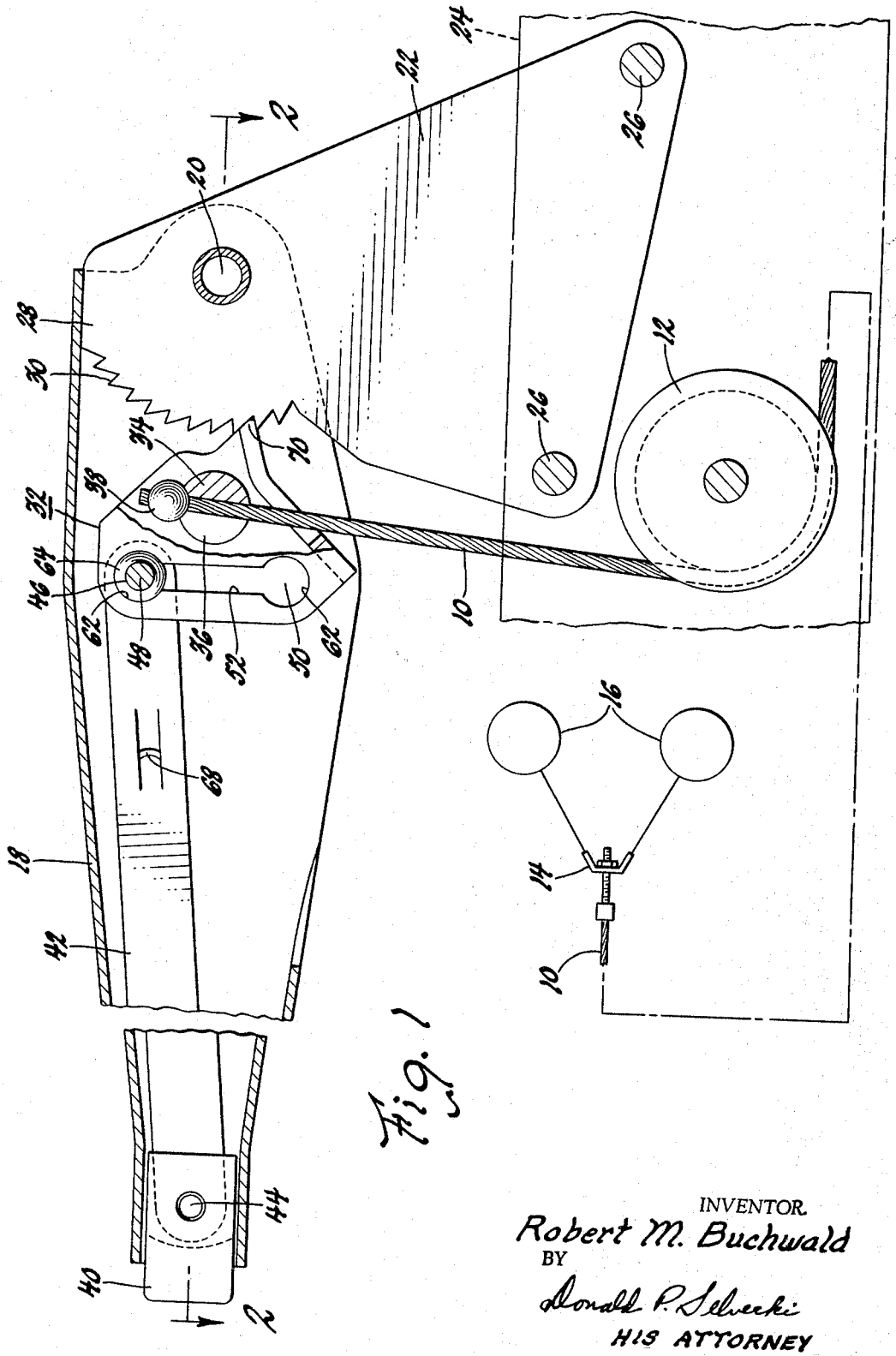

This invention relates to vehicle hand brake mechanisms and more particularly to a hand brake that is convertible from a conventional type to a fly-off type used in competition driving.

A conventional hand brake of the type described herein normally operates by a handle being rotated about a fixed pivot putting a force on a cable linked to the braking system of a vehicle. As the handle is rotated, a pawl follows a ratchet and, when the desired travel of the handle is reached, pressure is relieved therefrom allowing the pawl to engage the ratchet to maintain the handle near the furthest point of rotation. Release is usually accomplished by pivoting the pawl out of engagement with the ratchet as pressure is put in a direction previously moved thereby disengaging the pawl from the ratchet and allowing spring tension to return the handle to a position wherein the brake is released.

Fly-off type hand brakes operate in a slightly different fashion than conventional hand brakes. A fly-off brake is actuated by pivoting the handle around a fixed pivot and at some point near the end of desired travel a button is pressed to positively drive a pawl into engagement with a ratchet. Release is generally effected by merely exerting pressure on the handle in the direction previously rotated causing the pawl to be automatically withdrawn from the ratchet.

It is an object of the present invention to provide an improved band brake lever mechanism adapted for use as a conventional hand brake or fly-off type hand brake.

It is another object of the present invention to provide an improved hand brake lever mechanism capable of mechanically energizing vehicle brakes and which is spring loaded to engage during a first condition of operation and being drivable into an engaging configuration manually during another condition of operation.

It is yet another object of the present invention to provide an improved hand brake lever mechanism using an internally carried button to release the brakes under certain operating conditions and to utilize the same button to lock the brakes in an actuated disposition during other conditions of operation.

Further objects and advantages of the present invention will be apparent from the following description, reference being had to the accompanying drawings wherein a preferred embodiment of the present invention is clearly shown.

In the drawings:
FIGURE 1 is a sectional view taken along line 1—1 of FIGURE 2;
FIGURE 2 is a sectional view taken along line 2—2 of FIGURE 1;
FIGURE 3 is a sectional view taken along line 3—3 of FIGURE 2;
FIGURE 4 is a sectional view similar to FIGURE 1 with the pawl shown in the fly-off position.

Referring to FIGURE 1, a cable 10, sometimes referred to herein as the first means, is operable on pulley 12 connected to Y-shaped link 14 to actuate brakes on vehicle wheels 16 in a mechanical manner.

A handle 18, sometimes referred to herein as the actuator means, is pivoted at point 20 which is carried by bracket 22 in turn carried by a fixed portion of a vehicle 24 by mounting means 26. Ratchet means 28 is integrally formed with the bracket 22 and comprises teeth 30 arcuately positioned with respect to point 20.

Pawl means 32 is pivoted on pin 34 carried by actuator handle 18. Slot 36 formed in pin 34 is arranged to receive cable 10 on an end opposite from that engaging Y-shaped link 14. Ball end 38 carried by cable 10 prevents the casual withdrawal of cable 10 from slot 36. Button 40 is slidably disposed in an end of handle 18 pivotally connected to control rod 42 at point 44. Rod 42 pivotally engages holding pin 46 serving to secure control rod 42 to pawl 32. Pin 46 is adapted to travel from point 48 to point 50 in slot 52 formed in pawl 32.

Referring to FIGURE 2, holding pin 46 is seen to pass through actuator handle 18 and through pawl means 32 which is seen as a U-shaped unitary element. Pin 46 is secured to retainer 54 by pin 56. Control rod 42 is biased against flange 58 by spring 60. Spring 60 is therefore compressed between one surface of pawl 32 and control rod 42, thereby serving to hold holding pin 46 operatively positioned. Slot 52 in pawl 32 is enlarged at its ends at 62 which is carried on one leg of pawl 32 but has equally spaced sides on the opposite leg of pawl 32. Therefore, clearance is provided through pawl 32 at 62 allowing pin 46 to be depressed toward pawl 32. Chamfered face 64 of pin 46 engages the sides of aperture 66 formed in handle 18 preventing pin 46 from being withdrawn from handle 18. Spring 68 engages control rod 42 and handle 18 to maintain a biased engagement therebetween.

Referring to FIGURE 3, holding pin 46 is shown disposed in aperture 66 which is an arcuate slot formed in handle 18 permitting movement of pin 46 to any position thereof during various conditions of operation. The position of pin 46 in aperture 66 is determined by the relationship of pin 46 to slot 52 formed in pawl 32. In FIGURE 1, pin 46 is shown positioned in an enlarged portion of slot 52 wherein pawl 32 cooperates with teeth 30 to give the hand brake lever a conventional actuating capability. FIGURE 4 illustrates pin 46 positioned in slot 52 in a position it would assume when giving the hand brake lever mechanism a fly-off capability.

In operation, the conventional operation of the subject device will be described initially. Referring to FIGURE 1, handle 18 is pivoted in a clockwise manner about point 20, thereby drawing cable 10 around pulley 12 to actuate brakes in wheels 16 in a mechanical manner. As tension develops in cable 10 caused by the return springs in the wheel brakes, a force is exerted against pawl 32 tending to rotate pawl 32 in a counterclockwise fashion around pin 34. It should be noted that pawl 32 is positioned as shown in FIGURE 1 by pin 46 holding control rod 42 against pawl 32. Portion 70 of pawl 32 will slide along teeth 30 as handle 18 is moved in a clockwise direction.

As cable 10 is drawn taut and the brakes are fully engaged, it is merely necessary to release force from handle 18, thereby allowing it to travel slightly in a counterclockwise direction. Portion 70 will immediately engage one of the teeth 30 locking the handle 18 in the actuated position.

When it is desired to release the brake under conditions of conventional operation, button 40 is depressed as pressure is again put on handle 18 in a clockwise direction, thereby pivoting pawl 32 around pin 34 in a clockwise direction, thereby freeing portion 70 from teeth 30. While holding button 40 depressed, handle 18 is moved in a counterclockwise direction by the force of brake return springs until portion 70 is cleared of teeth 30 and the brakes are released.

Referring to FIGURE 3, when it is desired to give the hand brake lever mechanism a fly-off capability, pin 46 is depressed and moved in aperture 66 and in slot 52 of the pawl 32. When pin 46 assumes the position at the opposite end of the slot 52 from that previously positioned and as shown in FIGURE 4, the subject lever mechanism has a fly-off capability. This cycle of operation is carried out in much the same manner as previously described with handle 18 being moved in a clockwise fashion around point 20. Portion 70 of pawl 32 is maintained away from teeth 30 because of the holding action of control means 42 brought about by the repositioning of holding pin 46. As actuator handle 18 moves in a clockwise fashion around point 20, tension on cable 10 causes the brakes on wheels 16 to be energized. It is noted that portion 70 remains disengaged from teeth 30 during this period of operation and, when the brakes are fully energized and a locking disposition is desired, button 40 is depressed pivoting pawl 32 around pin 34 in a counterclockwise manner until contact is made by teeth 30 by portion 70. When contact is made, releasing of the pressure tending to move handle 18 around point 20 causes the locking of portion 70 against one of the teeth 30.

When a brake release is desired under conditions of operation when the fly-off capability is had, a slight movement of handle 18 in a clockwise direction allows portion 70 to be drawn clear of teeth 30 by the force exerted against control rod 42 by spring 68. Therefore, merely releasing the pressure against handle 18 will allow the brakes to become unlocked and a release of handle 18 will allow the deenergization of the brakes.

The utility of the subject invention is clear in an installation where the same hand brake lever mechanism is desired for conventional operation, such as for normal street driving, and where that same mechanism is desired to have a fly-off capability for competition driving. It is to be noted that the same mechanism utilized to lock the brakes during one condition of operation is used to unlock the brakes during another condition of operation.

While the embodiment of the present invention, as herein disclosed, constitutes a preferred form, it is to be understood that other forms might be adotped.

What is claimed is as follows:

1. A hand brake lever mechanism for a vehicle braking system, said mechanism comprising: actuator means pivotally supported on a fixed portion of the vehicle; ratchet means carried by a fixed portion of the vehicle and including teeth spaced in an arcuate path around the pivotal support of said actuator means; pawl means pivotally carried by said actuator means and having a portion selectively engageable with the teeth of said ratchet means; first means connecting said pawl means and the vehicle brakes; holding means formed in said pawl means; and control means slidably carried by said actuator means and engaging said holding means, said pawl means being shiftable into a first position established by said holding means wherein said pawl means is engageable with said ratchet means in response to movement of said control means, said pawl means being shiftable into a second position also established by said holding means wherein said pawl means is disengageable from said ratchet means in response to movement of said control means.

2. A hand brake lever mechanism for a vehicle braking system, said mechanism comprising: actuator means pivotally supported by a fixed portion of the vehicle, said actuator means including a portion adapted to be manually gripped at one extremity; ratchet means carried by a fixed portion of the vehicle and having teeth equally spaced on an arcuate path around the pivotal support of said actuator means; pawl means pivotally carried by said actuator means and having a portion adapted to engage the teeth of said ratchet means, said pawl means having at least two fixed pivotal positions; first means for drivably connecting said pawl means and the vehicle brakes for energization thereof; holding means for locating and holding said pawl means in at least two positions in its pivotal mounting; and control means slidably carried by said actuator means and engaging said holding means to vary the pivotal position of said pawl means, said pawl means pivotable to a first position wherein a pivotal movement of said actuator means results in a locking engagement between said pawl means and said ratchet means, said pawl means being releasable by a sliding movement of said control means, said pawl means pivotable to a second position wherein said pawl means is lockingly engageable with said ratchet means in response to a sliding movement of said control means during a pivotal movement of said actuator means, said pawl means releasable from the locking engagement with said ratchet means by an overtravel movement of said actuator means.

3. A hand brake lever mechanism according to claim 2 wherein said pawl means is a unitary member having slots formed therein with at least two enlarged stop portions, said slots slidingly cooperating with said holding means to effect a pivotal movement of said pawl means on its mounting.

4. A hand brake lever mechanism according to claim 3 wherein said pawl means pivotally engages said control means by a spring biased pin formed as a portion of said holding means.

5. A hand brake lever mechanism according to claim 2 wherein said pawl means is pivotally supported by being interlocked between portions of said actuator means and said first means.

6. A hand brake lever mechanism according to claim 2 wherein said first means is a cable having a beaded end retained in a slotted pin serving as the pivotal support of said pawl means.

References Cited

UNITED STATES PATENTS 2,281,155     4/1942     Jandus et al. _____ 74—536

MILTON KAUFMAN, *Primary Examiner.*